(12) United States Patent
Salazar Cardozo et al.

(10) Patent No.: US 11,456,944 B1
(45) Date of Patent: Sep. 27, 2022

(54) MANAGING OUTAGE REPORTING USING LAST GASPS

(71) Applicant: Landis+Gyr Innovations, Inc., Alpharetta, GA (US)

(72) Inventors: Ruben E. Salazar Cardozo, Johns Creek, GA (US); James Randall Turner, Alpharetta, GA (US); Anish Joshi, Austin, TX (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 0 days.

(21) Appl. No.: 17/236,312

(22) Filed: Apr. 21, 2021

(51) Int. Cl.
  *H04L 45/02* (2022.01)
  *H04L 45/028* (2022.01)
  *H04L 41/0823* (2022.01)
  *H04L 41/0816* (2022.01)
  *H04L 67/12* (2022.01)

(52) U.S. Cl.
  CPC ........ *H04L 45/026* (2013.01); *H04L 41/0816* (2013.01); *H04L 41/0836* (2013.01); *H04L 45/028* (2013.01); *H04L 67/12* (2013.01)

(58) Field of Classification Search
  CPC ............... H04L 45/026; H04L 41/0816; H04L 41/0836; H04L 45/028; H04L 67/12
  See application file for complete search history.

(56) References Cited

U.S. PATENT DOCUMENTS

| 10,340,980 | B1* | 7/2019 | Wolter ..................... H04Q 9/00 |
| 11,089,103 | B1* | 8/2021 | Parulkar ............. H04L 67/1097 |
| 2014/0085105 | A1 | 3/2014 | Vaswani et al. |
| 2015/0249595 | A1* | 9/2015 | Geiger .................. H04L 45/123 |
| | | | 370/392 |
| 2020/0213929 | A1 | 7/2020 | Edwards et al. |

FOREIGN PATENT DOCUMENTS

| EP | 3088846 A1 | 11/2016 |
| EP | 3371930 A1 | 9/2018 |

OTHER PUBLICATIONS

PCT/US2022/025023, International Search Report and the Written Opinion, dated Jul. 1, 2022, 16 pages.

* cited by examiner

*Primary Examiner* — Jung H Park
(74) *Attorney, Agent, or Firm* — Kilpatrick Townsend & Stockton LLP

(57) ABSTRACT

Detecting an outage by a first node in layer N of a multi-layer mesh network that is in communication with a root node via the mesh network. After waiting for a sustained outage period that expires, the first node waits for a layer-specific time interval that is based on a topology of the second layer. The first node receives a last gasp from a second node in layer N+1 of the multi-layer mesh network. The last gasp includes an identifier for the second node and an indication of layer N+1. After the layer-specific time interval expires, the first node transmits a consolidated last gasp that includes an identifier for the first node, an indication of layer N, the identifier for the second node, and the indication of layer N+1.

23 Claims, 5 Drawing Sheets

MANAGING OUTAGE REPORTING USING LAST GASPS

TECHNICAL FIELD

The present disclosure is generally directed to managing outage reporting in a mesh network. More specifically, but not by way of limitation, this disclosure relates to managing outage reporting using one or more last gasps in a mesh network to communicate outage information.

BACKGROUND

Some resource providers utilize mesh networks to provide a communications platform for various networked nodes. For instance, resource providers, such as utility companies, home automation, industrial monitoring, or scientific application providers, etc. may monitor networked nodes via a mesh network. In some cases, network outages may be managed by reporting such events using last gasps.

SUMMARY

Systems and methods of the present disclosure provide communication techniques in a mesh network. A device located at a premises may include a node. The node may be connected to a network along with a number of other nodes and may communicate with a central system via the mesh network. The device may be configured to detect and report network outages using last gasps in the network. Further, the device can reliably relay a report of a network outage across the mesh network, ensuring network outages are reported, even from an outermost edge of the mesh network. The device sends last gasps towards a collector, using intelligent processing and filtering, as well as using different timings associated with different network layers.

The present disclosure includes an outage management system uses a last gasp to relay reporting information to a head-end. The last gasp reports information about nodes experiencing an outage condition. After a sustained outage period a reporting node receives one or more last gasps from the nodes in the mesh network. And in a case where the reporting node is experiencing an outage condition itself, the reporting node generates a consolidated last gasp that includes the one or more last gasps and its own last gasp information. The reporting node transmits the consolidated last gasp according to their respective scheduled last gasp time that is directed to the head-end. Thus, certain aspects described herein improve reporting for outage conditions across the mesh network.

One example method for reporting outage information in a multi-layer mesh network, includes: detecting, by a first node in layer N of the multi-layer mesh network, an outage condition; after detecting the outage condition, waiting for a predetermined sustained outage period; after the predetermined sustained outage period expires, continuing to wait for a layer-specific time interval, wherein the layer-specific time interval is based on a topology of layer N; receiving a last gasp from a second node in layer N+1 of the multi-layer mesh network, wherein the last gasp includes a second identifier for the second node and an indication of layer N+1; and after the layer-specific time interval expires, transmitting a consolidated last gasp, wherein the consolidated last gasp includes a first identifier for the first node, an indication of layer N, the second identifier for the second node, and the indication of layer N+1. In some example methods, a reception of last gasps from other layers may start at the end of a sustained outage period and continue for several k intervals, for example, until a respective k interval and its randomization period are completed, and then a consolidated last gasp may be transmitted.

Another example system includes a first node in layer N of a multi-layer mesh network that includes a processor configured to execute computer-readable instructions; and a memory comprising computer-readable instructions. When executed by the processor, the computer-readable instructions are configured to cause the processor to perform operations comprising: detecting an outage condition; after detecting the outage condition, waiting for a predetermined sustained outage period; after the predetermined sustained outage period expires, continuing to wait for a layer-specific time interval, wherein the layer-specific time interval is based on a topology of layer N; receiving a last gasp from a second node in layer N+1 of the multi-layer mesh network, wherein the last gasp includes a second identifier for the second node and an indication, such as an identifier of layer N+1; and before the layer-specific time interval expires, transmitting a consolidated last gasp, wherein the consolidated last gasp includes a first identifier for the first node, an indication of layer N, the second identifier for the second node, and the indication of layer N+1. In some example systems, a reception of last gasps from other layers may start at the end of a sustained outage period and continue for several k intervals, for example, until a respective k interval and its randomization period are completed, and then a consolidated last gasp may be transmitted.

These and other features, aspects, and advantages of the present disclosure are better understood when the following Detailed Description is read with reference to the accompanying drawings.

DETAILED DESCRIPTION

Figure 1:
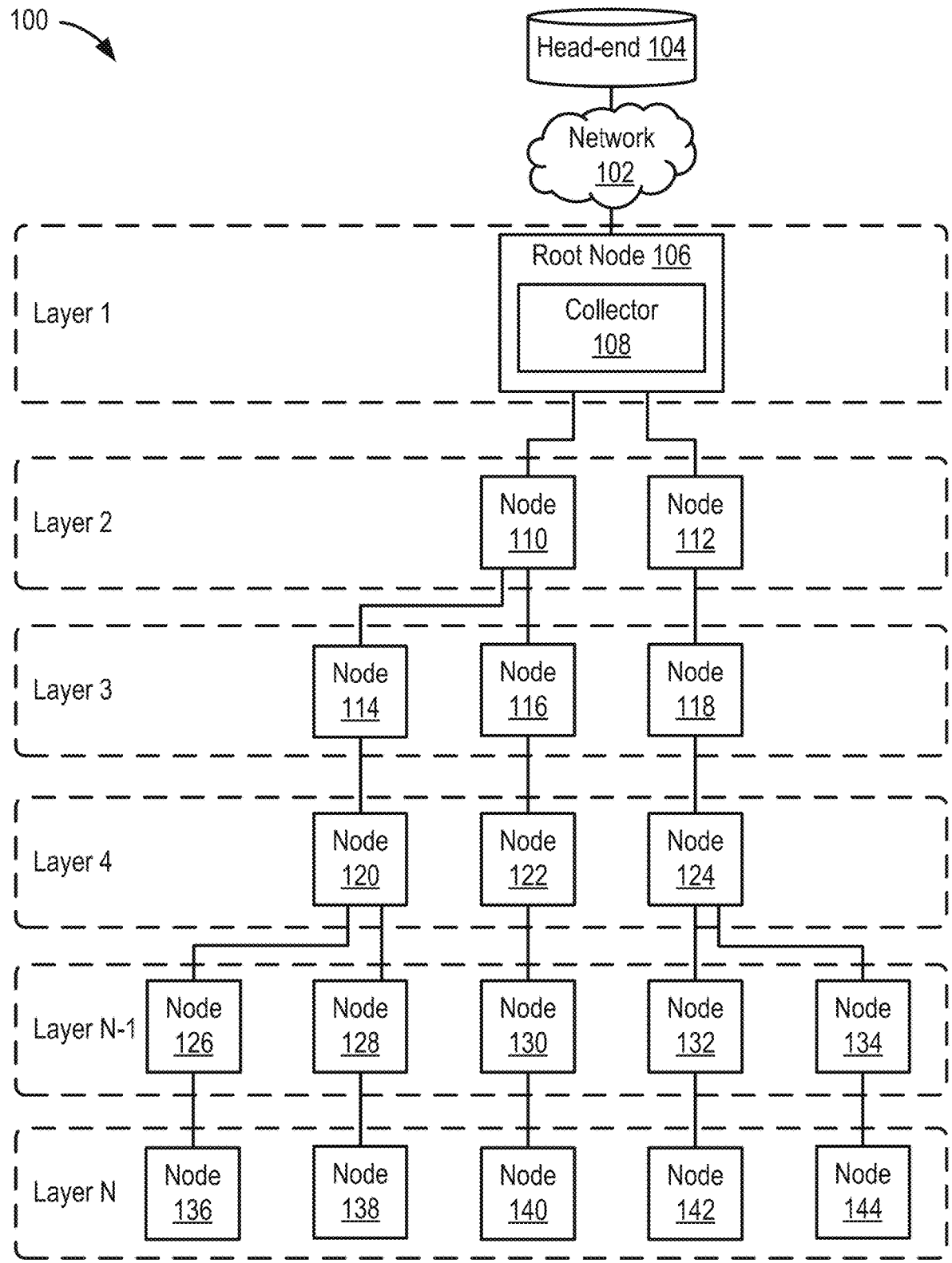
FIG. 1 illustrates an exemplary network environment for reporting outages using last gasps in a mesh network, according to certain aspects of this disclosure.

Aspects of this disclosure use last gasps to report outages in a mesh network. Additional aspects of the disclosure may increase a likelihood of effectively reporting outages using one or more last gasps in a mesh network. Certain aspects of the disclosure involve using a last gasp to report network outage information. The following non-limiting examples are provided to introduce certain aspects of this disclosure.

Some existing outage management solutions process a single last gasp for endpoints that are experiencing an outage condition that causes operations to stop immediately afterwards. Some existing outage management solutions may have limitations for large or total network outages. For instance, nodes that do not have direct connectivity to a device that is still powered and connected to a head-end, may not have their particular outage reported. Additionally, some existing outage management solutions may fail to report network outages from nodes with connectivity to a still-powered node, even though their remaining connectivity was sufficient to perform as expected. Thus, there is a need to improve performance results for outage reporting events over existing outage management solutions.

Certain aspects described herein can achieve improved performance results for outage reporting events. Some aspects of this disclosure can eliminate reporting of false positive outage events. Further, some aspects can minimize or exclude changes to a head-end. Other aspects utilize currently available hardware. In doing so, certain aspects can be applied to multiple versions of an RF mesh protocol, multiple layers, and/or multiple families of meters.

In one example, an outage management system uses a last gasp to relay reporting information to a head-end. For instance, the last gasp can ensure that every endpoint experiencing an outage condition (e.g., a loss of power) sends its last gasp after computing a sustained outage period that is added to a time interval that depends on a topographical layer in which the particular endpoint resides within the mesh network. The sustained outage period may be substantially the same for all nodes within the mesh network. Further, every node can receive last gasps from the network, starting immediately after a completion of the computed sustained outage period. Each node continues receiving last gasps until a transmission of its own last gasp.

Each node experiencing an outage condition concatenates and sends multiple last gasps (e.g., consolidated or complex last gasps) to relay outage information. Consolidated or complex last gasps may include a common header, an outage header, an outage message, a node ID from one or more nodes experiencing an outage condition. The outage condition may include a loss of power. In some implementations, the outage condition may include other conditions, such as a determination of an impending inability to continue to operate properly. Further, the receiving node may receive this outage information for the one or more nodes experiencing the outage condition in the form of a last gasp packet from each of the one or more nodes. The receiving node may receive outage information in the form of one or more last gasp packets, a consolidated last gasp, or more than one consolidated last gasps.

Continuing with this example, each node experiencing an outage condition transmits a consolidated last gasp according to their respective scheduled last gasp time. Each node experiencing an outage condition starts transmission of consolidated last gasps beginning at the scheduled last gasp time based on the predetermined sustained outage period and its layer-specific time interval (e.g., based on a topographical layer in which the particular node resides within the mesh network). Each node with power processes consolidated last gasps and converts them to outage messages that are directed to the head-end. In some examples, a last gasp may be optimized based on a length of the predetermined sustained outage period, a length of the layer-specific time interval, an amount of energy storage associated with the node, or a combination of these. Certain aspects described herein improve reporting for various outage conditions across a multi-layer mesh network to one or more collectors, such as a powered, root node, or head-end.

Exemplary Operating Environment

The present disclosure may operate within a node of a network, where the node includes an ability to communicate last gasps. FIG. 1 illustrates an exemplary network environment 100 that includes an mesh network (e.g., a radio frequency ("RF") mesh network, a powerline communication ("PLC") network, a channel hopping mesh network, a time-slotted channel hopping ("TSCH") mesh network, a wireless smart ubiquitous network ("Wi-SUN"), a Wi-SUN field area network ("Wi-SUN FAN"), an unsynchronized mesh network, etc.). The network environment 100 includes a root node 106, and nodes 110, 112, 114, 116, 118, 120, 122, 124, 126, 128, 130, 132, 134, 136, 138, 140, 142, and 144, each of which may be in communication with a head-end 104 via a communication network 102.

The head-end 104 communicates with the root node 106 and the nodes 110-144 via the communications network 102. The communications network 102 may include a telephony network, a wireless telephony network, a wireless personal area network ("WPAN"), a local area network ("LAN"), wide area network ("WAN"), metro area network ("MAN"), another data network, or any other suitable communications network. In some examples, the head-end 104 can provide centralized controls for a mesh network via the communication network 102.

The head-end 104 may distribute network information using various types of communication signals. The head-end 104 may communicate network information using a RF signal, a global system for mobile communications ("GSM") signal, a low power radio ("LPR") signal, a media-independent signal, a consumption signal, another suitable electrical signal, etc. In some examples, the head-end 104 may provide monitoring services (e.g., for outages, up-time, or health statuses), geographic information, data collection (e.g., for meter data, connectivity, quality of service, etc.), scheduling information, other operational information, etc. The head-end 104 may be capable of sending messages or notifications to various network elements such as the root node 106 and the nodes 110-144.

The network environment 100 also includes a root node 106. The root node 106 facilitates communications across the network environment 100. The root node 106 includes a collector 108 (e.g., a collector node, collector radio, or another data collection device). The collector 108 may receive data from nodes using an integrated antenna. The collector 108 may also include a collector ID and may be in communication with the head-end 104. The root node 106 resides in a first layer (e.g., layer 1) of a mesh network in the network environment 100.

The root node 106 may be a PAN coordinator, border router, gateway router, exterior router, or any other suitable gateway device. Further, the root node 106 may maintain network information for the nodes 110-144 within the network environment 100. The root node 106 may also include data storage, energy storage, memory, another data repository, etc. that contains network information. Such network information may include a list of node IDs, network ID, network topology (e.g., including network layers), network information for any number of connected devices (e.g., asynchronous unicast schedules for nodes 110-144), broadcast schedules, other network features, a combination of these, etc. The root node 106 may be maintained, continuously, as a powered node.

The network environment 100 further includes nodes 110-144. The node 110 is a parent node to child nodes 114, 116. Similarly, the node 110 is a grandparent node to grandchildren nodes 120, 122. Nodes 110 and 112 reside in layer 2 of the mesh network, each of which are child nodes of and in communication with the root node 106. The nodes 110, 112 share a common layer-specific time interval because both nodes reside in the same topographical layer (e.g., layer 2) within the mesh network.

The nodes 114, 116, and 118 have the same layer-specific time interval, which is computed based on the topographical features of layer 3. Layer 4 includes nodes 120-124, each of which having the same layer-specific time interval. Likewise, layer N−1 includes nodes 126-134, each of which having the same layer-specific time interval, and layer N includes nodes 136-144, each of which having the same layer-specific time interval. It should be appreciated that while each of the nodes that are resident within a particular layer may share the same layer-specific time interval, and each of the layers may have different layer-specific time intervals based on unique topographical features.

Each node 110-144, residing in its respective layer (e.g., layer 2, 3, 4, N−1, or N), may have a different last gasp interval. The last gasp intervals may vary based on a predetermined sustained outage period (e.g., a predetermined 30 second ("s") sustained outage interval). In some examples, the predetermined sustained outage period is followed by a quasi-random time interval (e.g., a predetermined time duration measured in milliseconds ("ms")). This quasi-random time interval can also vary depending on one or more capabilities of a given node. These capabilities may include an amount of stored energy, efficiency of one or more processors, or available amount of storage, etc. The predetermined sustained outage period may be dictated by head-end 104 or root node 106.

The network environment 100 includes an outage management system that uses a last gasp to relay reporting information to the root node 106 and/or head-end 104. The last gasp can be implemented to ensure that every endpoint experiencing an outage condition sends its last gasp after computing the predetermined sustained outage period that is added to a layer-specific time interval that depends on one or more configurations parameters, such as topographical features associated with the layer the node resides in. The last gasp may use a randomization factor so that nodes in the same layer transmit their last gasp at different times within the layer-specific time interval.

A length or duration of a last gasp interval can be "tuned" to the needs of a resource provider, for example, by modifying one or more of the configurations parameters of the layer-specific time interval. Configuration parameters may include a length of a predetermined sustained outage period, a value of a coefficient associated with a topology for a given layer that is used to calculate the layer-specific time interval, a layer that a node resides in, a maximum number of last gasp packets, consolidated last gasps, or other outage messages, or another suitable configuration parameter. The configuration parameters may be updated without implementing a firmware update. For instance, the configuration parameters may be sent to a node over-the-air ("OTA"). Further, either of the head-end 104 or root node 106 may send such changes to the configuration parameters to nodes 110-144.

Figure 2:
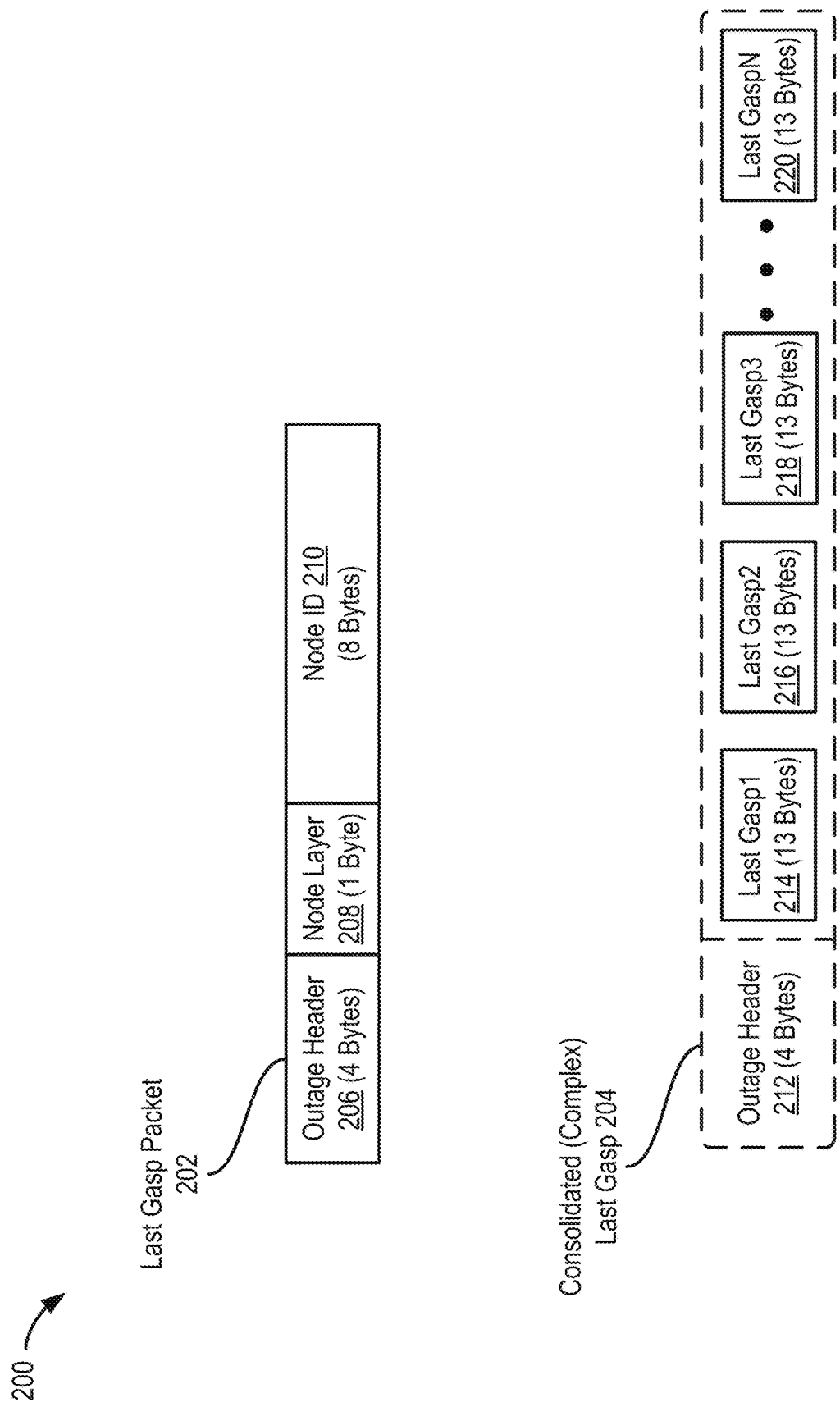
FIG. 2 illustrates a last gasp packet and a consolidated last gasp for reporting outages using last gasps in a mesh network, according to certain aspects of this disclosure.

FIG. 2 shows examples of last gasps 200, including a last gasp packet 202 and a consolidated (complex) last gasp 204. The last gasp packet 202 includes an outage header 206, node layer 208, and a node ID 210. The last gasp packet 202 has a total packet size of 13 bytes and contains last gasp information fields that include an outage header 206 (4 bytes), a node layer 208 (1 byte), and a node ID 210 (8 bytes).

The outage header 206 includes information about the outage condition. For instance, the outage header 206 may include an alarm, alert, or other notification that indicates a type of outage condition. The outage header 206 may include an indication of a change in status or timing information associated with outage condition. The node layer 208 is a last gasp information field that includes an indication of a network layer (e.g., a network layer identifier) where the outage condition occurred. For instance, the node layer 208 can indicate a network layer or other location information corresponding to the node experiencing the outage condition.

The node ID 210 is a last gasp information field that includes information for reporting the outage of the node experiencing the outage condition (e.g., a dying node). Either of the outage header 206 or the node ID 210 may include a description of the outage condition, ID of the node experiencing the outage condition, or timestamp corresponding to a time of the outage condition (e.g., indicating a time when the power outage occurred), etc. In additional or alternative examples, both of the outage header 206 and the node ID 210 may include some amount of redundant outage information to ensure delivery of a notification of the outage condition.

The outage header 206 of the last gasp packet 202 also includes header fields, such as a physical layer ("PHY") header, Media Access Control ("MAC") layer header, Internet Protocol ("IP") header, ("UDP") header, application header, etc. In one example, the outage header 206 includes a PHY header and a MAC layer header. These header fields may be used to indicate a type of the packet (e.g., that the packet is a last gasp packet 202). Further, a receiving node may utilize such header fields to determine a need to parse the last gasp packet 202 using a particular format or decoding technique.

It should be appreciated that the last gasp packet 202 may include any number of additional information fields. Similarly, the last gasp packet 202 need not be limited to 13 bytes and may include any suitable amount data. The structure of last gasp packet 202 may be simplified or the overall size of the last gasp packet 202 may be reduced to minimize an amount of power and/or energy that is required for a node experiencing an outage condition to generate and transmit the last gasp packet 202.

The consolidated last gasp 204 includes information about the outage condition. For instance, the consolidated last gasp 204 includes an outage header 212, last gasp1 214, last gasp2 216, last gasp3 218, and last gaspN 220. The outage header 212 is 4 bytes in length and may include substantially similar information as the outage header 206 (e.g., a header field, description of the outage conditions, IDs of the nodes experiencing outage conditions, and/or timestamps associated with the outage conditions, etc.). Each of the last gasps 214-220 are 13 bytes in length. And each of the last gasps 214-220 may include substantially similar information and/or structure as the last gasp packets 202 described above.

For instance, the node (e.g., node 116) can send a consolidated last gasp 204 that includes a last gasp1 214 that represents a last gasp packet 202 for itself. The node 116 may also send the consolidated last gasp 204 with a last gasp2 216 from node 120, a last gasp3 218 from node 126, and a last gaspN 220 from node 128. Each of these last gasps 216-220 in the consolidated last gasp 204 may include concatenated last gasp packets 202 from nodes 120, 126, and 128, respectively.

Each consolidated last gasp 204 may include a maximum number of last gaps (e.g., last gasp1 214, last gasp2 216, last gasp3 218, last gaspN 220, etc.). Each consolidated last gasp 204 may also include a maximum number of node IDs. In one example, a single consolidated last gasp 204 may include up to 12 node IDs. The single consolidated last gasp 204 may include the contents of 12 last gasp packets 202 (e.g., each of the 12 last gasp packets 202 including one or more outage headers 206, node layers 208, and/or node IDs 210). In some examples, a node transmits a last gasp that includes one or more last gasp packets 202, consolidated last gasps 204, or both. It should be appreciated that any suitable communication protocols or formats may be used to send and receive one or more last gasps.

Figure 3:
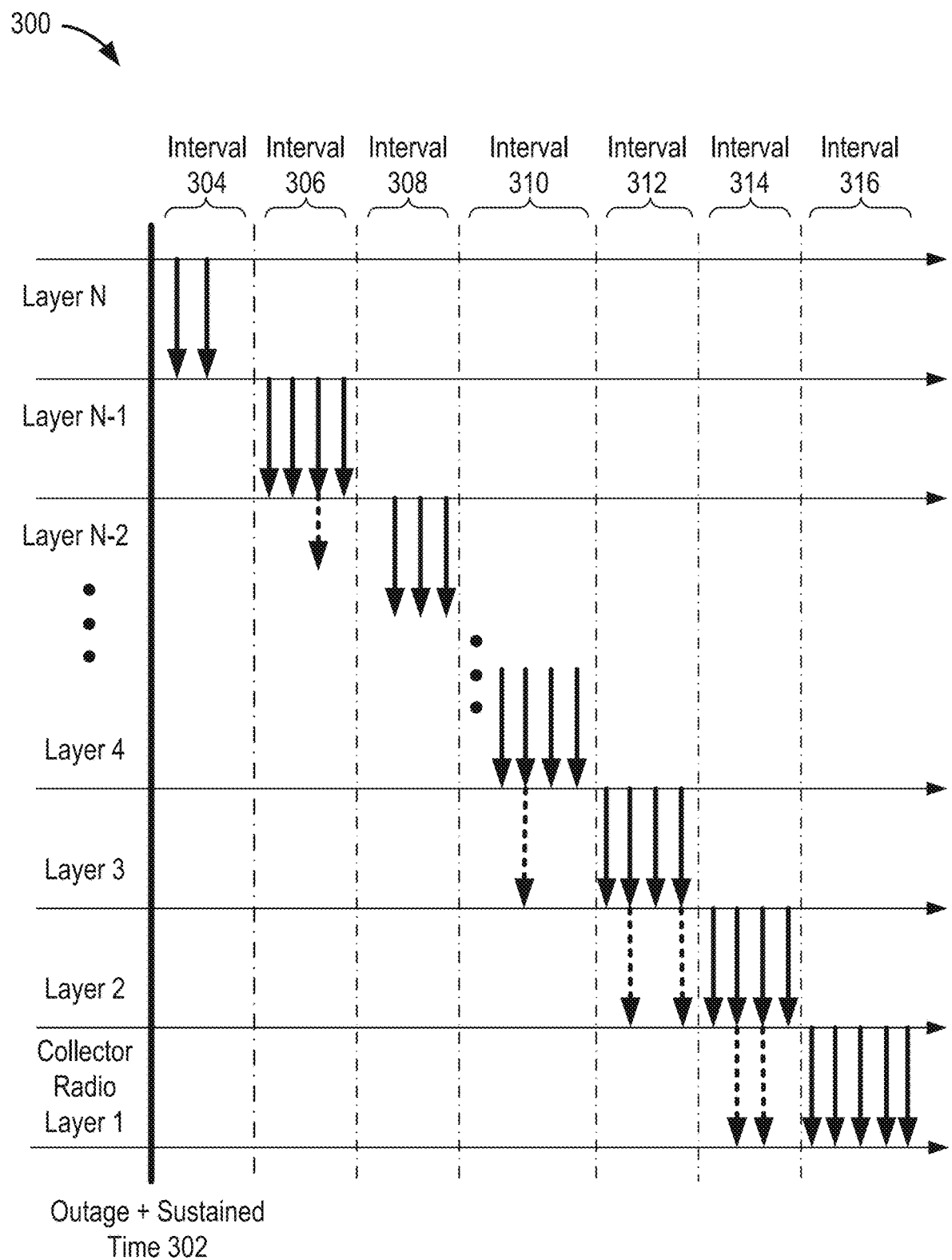
FIG. 3 illustrates exemplary network communications in a network environment for reporting outages using last gasps in a mesh network, according to certain aspects of this disclosure.

FIG. 3 illustrates exemplary network communications in a network environment 300 for reporting outages using last gasps in a mesh network. One or more operations described with respect to FIG. 3 involve communicating in a mesh network (e.g., network environment 100). The network environment 300, like the network environment 100, facilitates communications between various network devices (e.g., head-end 104, root node 106, nodes 110-144, 400, etc.) according to aspects described herein. A communication device (e.g., a node 106, 110-144, or 400) implements operations depicted in FIG. 3 by executing suitable program code (e.g., software components related to last gasp packets 202, consolidated last gasps 204, etc.). For illustrative purposes, the network environment 300 is described with reference to certain examples depicted in the figures. Other implementations, however, are possible.

The network environment 300 shows a predetermined sustained outage period for a widespread network outage that includes an outage and sustained time 302. The outage and sustained time 302 may be determined in a similar manner as described above, with respect to the predetermined sustained outage period of FIG. 1. Like the multi-layer mesh network depicted in FIG. 1, the network environment 300 includes several layers: layer N, layer N−1, layer N−2, layer 4, layer 3, layer 2, and collector layer 1. The network environment 300 also includes various layer-specific time intervals 304-316 that correspond to each of the layers in the multi-layer mesh network. Each of the layer-specific time intervals 304-316 correspond to 5 layers in the multi-layer mesh network. In some examples, last gasp packets 202 and/or consolidated last gasps 204 are sent during layer-specific time intervals 304-316.

In a simplified example, multiple nodes experience an outage condition. One node (e.g., node 136) in layer N experiences the outage condition that includes a loss of power. In response to detecting the loss of power, the node 136 waits for a predetermined sustained outage period. The predetermined sustained outage period may be dictated by the root node 106 or the head-end 104. In other examples, the node 136 computes a predetermined sustained outage period based on its available resources (e.g., based on a backup battery supply). The node 136 waits for the predetermined sustained outage period, which is depicted in FIG. 3 as expiring at the outage and sustained time 302.

Each of the lines between layers represent a transmission of a last gasp from a node in a particular layer to other nodes in the network. After the outage and sustained time 302 elapses, the node 136 broadcasts a last gasp packet (e.g., a last gasp packet 202), which is received by a node (e.g., node 126) in the layer N−1 during the layer-specific time interval 304 (e.g., based on a topography of layer N). The node 136 may transmit the last gasp packet 202 to the node 126 via a broadcast, multicast, unicast, or any other suitable type of message. In additional or alternative examples, a node that resides in a layer that is further from layer 1 than the layer N may send its own last gasp during the same layer-specific time interval 304 used by nodes in layer N.

Node 126 receives the outage information that includes the last gasp packet 202 from node 136. The node 126 also experiences the outage condition. In response, node 126 generates a consolidated last gasp (e.g., a consolidated last gasp 204) that includes the outage information from node 136, as well as its own outage information (e.g., in the form of another last gasp packet 202). The node 126 relays the consolidated last gasp 204 during the layer N−1-specific time interval 306.

The mesh network may include any number of additional layers, such as layer N−2. Each of these additional layers may include their own particular layer-specific time interval. For instance, node 120 receives the consolidated last gasp 204 having outage information that has been forwarded by nodes during previous layer-specific time intervals (e.g., layer-specific time intervals 304, 306, 308, etc.). A layer 4 node (e.g., node 120) receives the consolidated last gasp 204 that includes outage information for nodes 126 and 136 during the layer-specific time interval 310. Node 120 relays a consolidated last gasp 204 to a layer 3 node (e.g., node 116) during layer-specific time interval 312. Similarly, node 116 relays a consolidated last gasp 204 to a layer 2 node (e.g., node 110) during layer-specific time interval 314. Node 110 sends a consolidated last gasp 204 to a collector layer 1 node (e.g., root node 106) during layer-specific time interval 316.

The first layer-specific time interval 304 includes two solid lines, each of which represents a transmission of a last gasp from a layer N node to a layer N−1 node. Similarly, while waiting for an expiration of the second, layer N−1 specific time interval 306, the four solid lines represent transmissions from four nodes in layer N−1 to a node in layer N−2, each of which are experiencing an outage condition. Additionally, the second, layer N−1 specific time interval 306 includes a dotted line that represents a last gasp from one of the nodes experiencing the outage condition, which is received by a layer 4 node. For instance, in some mesh networks a layer 4 node may be listening for and hearing communications from certain nodes in layer N−1. In additional or alternative aspects, the layer 4 node may receive the last gasp based on a physical proximity to the transmitting node from layer N−1. A third, layer N−2 specific time interval 308 represents an ability to use any suitable number of layers and corresponding layer-specific time intervals.

The layer 4 node receives 4 last gasps during the layer-specific time interval 310. A layer 3 node receives 4 last gasps during the layer-specific time interval 312. During the layer-specific time interval 312, a layer 2 node also receives two last gasps that are represented by the dotted lines from a layer 4 node. Subsequently, during the layer-specific time interval 314, a layer 2 node receives four last gasps, represented by the solid lines, from one or more layer 3 nodes.

Since the layer 2 node previously received two of the last gasps from the layer 4 node (e.g., during the layer-specific time interval 312), the four last gasp received during the layer-specific time interval 314 from the one or more layer 3 nodes may include several duplicate last gasps. The four last gasps includes at least two duplicate last gasps. The at least two duplicate last gasp may include more than two duplicate last gasps, if the duplicate last gasps include consolidated last gasps 204. Although the layer 2 node hears two last gasps during the layer-specific time interval 312 and four last gasps during the layer-specific time interval 314, the layer 2 node waits to send the consolidated last gasps 204 until an expiration of its specific last gasp interval (e.g., the outage and sustained time 302+a sum of all of the layer-specific time intervals before and including layer-specific time interval 314—i.e., outage and sustained time 302+ layer-specific time intervals 304-314).

During the layer-specific time interval 314, the collector layer 1 node (e.g., root node 106) receives two last gasps from one or more layer 3 nodes. Lastly, during the layer-specific time interval 316, the root node 106 receives five last gasps from one or more layer 2 nodes, which may also include the duplicate last gasps received during the layer-specific time interval 314 (e.g., the at least two duplicate last gasps described above). As described in greater detail below, with respect to FIG. 5, each of the nodes that receive duplicate last gasps across layers may de-duplicate these last gasps before, during, or after generating a consolidated last gasp 204.

Exemplary Node

Figure 4:
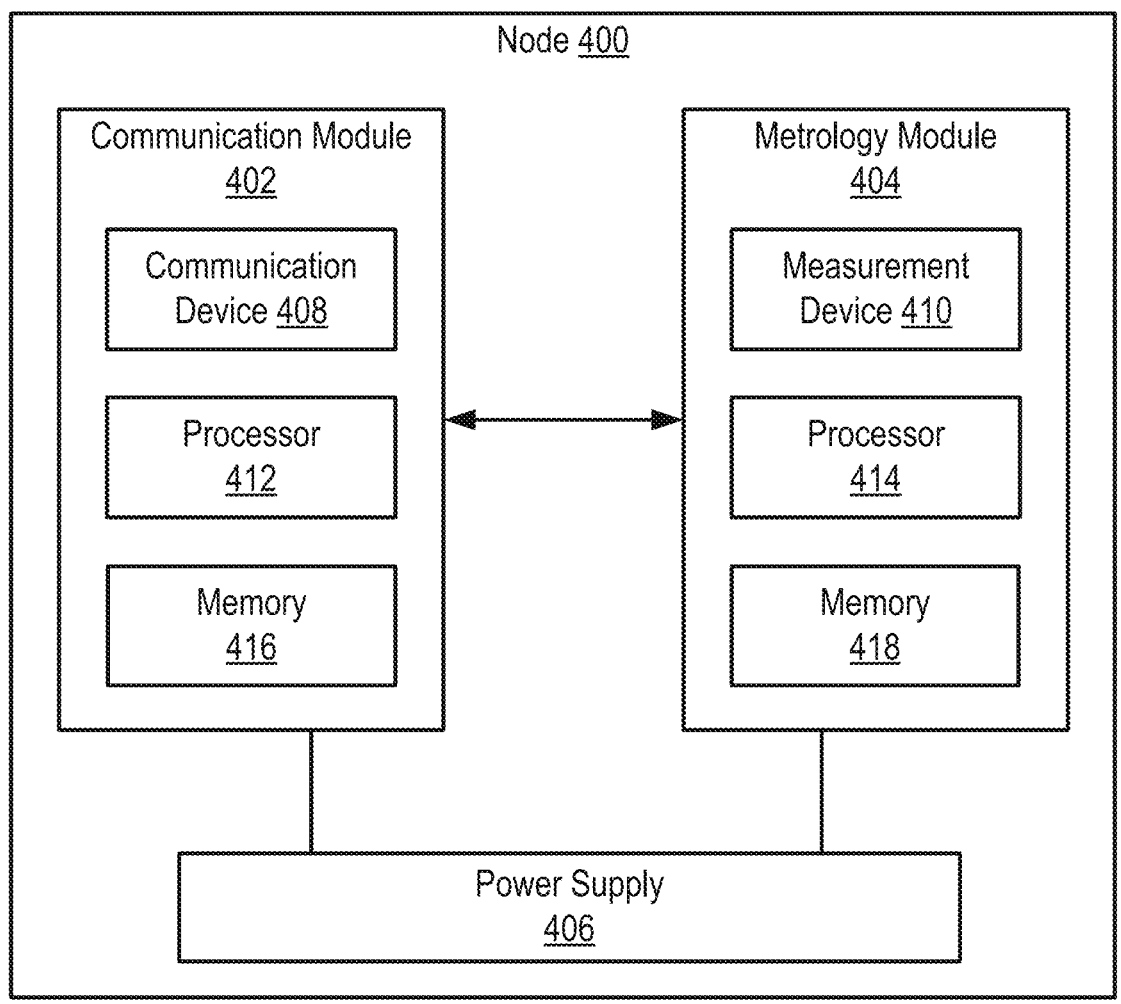
FIG. 4 illustrates an exemplary node, according to certain aspects of this disclosure.

FIG. 4 illustrates an exemplary node 400. Some or all of the components of exemplary node 400 can belong to one or more of the nodes of FIG. 1 (e.g., nodes 106 and 110-144). The node 400 includes a communication module 402, a metrology module 404, and a power supply 406, each of which are connected through a local or serial connection. The communication module 402, metrology module 404, and power supply 406 may be communicatively coupled via a bus.

The node 400 includes the communication module 402. The communication module 402 provides functions for sending and receiving various messages to and from other nodes in the network environment 100. For instance, the communication module 402 sends and receives messages, such as last gasp packets 202, consolidated last gasps 204, other outage messages, or network communication messages, etc. The communication module 402 includes a communication device 408, processor 412, and memory 416.

The communication device 408 may include an antenna, a radio, or any other device that provides suitable wireless or wired communication. In one example, the communication device 402 includes a transceiver device, such as an RF transceiver, that is capable of transmitting and receiving RF communication from other nodes in the network environment 100. The transceiver may include, be communicatively coupled to, or be physically connected to an antenna, and the transceiver may be used to send and receive communications on the network (e.g., communications with other nodes, such as unicast messages or broadcast messages).

The processor 412 controls functions performed by the communication module 402, including one or more operations described herein. The processor 412 may include a microprocessor, an application-specific integrated circuit ("ASIC"), a state machine, a field programmable gate array ("FPGA"), or another suitable computing device. The processor 412 can include any number of computing devices and can be communicatively coupled to a computer-readable medium, such as memory 416. The processor can execute computer-executable program instructions or access information stored in memory to perform operations described herein. The instructions may include processor-specific instructions generated by a compiler and/or an interpreter from code written in any suitable computer-programming language. When instructions are executed, they may configure the node 400 to perform any of the operations described herein.

The memory 416 may be utilized to store data that is used by the processor 412 to perform various functions. The memory 416 can store information for the specific meter, layer, or outage information in the node 400. Other information and settings may also be stored in the memory. The memory may be a computer-readable medium and in addition to storing information and settings may store computer executable instructions which when executed may configure the communication module to perform the operations described herein.

The node 400 also includes the metrology module 404. The metrology module 404 includes a measurement device 410, a processor 414, and a memory 418. The metrology module 404 provides functions necessary for node 400 to manage resources. The metrology module 404 can provide access to a resource and can be used to measure an amount of the resource that is being consumed. For instance, the measurement device 410 includes a meter. The measurement device 410 may use the meter to measure the consumption of the resource, such as gas, electricity, or water at a premises. The meter may be included in the node 400, where the node 400 communicates consumption information to a central system or head-end system.

The metrology module 404 may also include additional components, such as metrology components. Metrology components may include one or more measurement devices 410, a metrology application or metrology software component, metrology script, a sensor, measurement circuitry, etc. Further, a central system (e.g., head-end 104) may analyze consumption information to manage the resource at the premises and to manage other aspects of the system.

The processor 414 in the metrology module 404 controls functions of the metrology module 404 by executing computer-executable program instructions or access information stored in memory to perform operations described herein. The memory 418 stores data needed by the processor 414 to perform these operations. The processor 414 and memory 418 may include all of the capabilities described above, with respect to processor 412 and memory 416.

The node 400 also includes a power supply 406. The power supply 406 provides power to the components of the node 400. The power supply 406 may include an A/C power supply or a low energy source, such as a battery. The power supply 406 is connected to and configured to continuously provide power to the communication module 402 and metrology module 404. The communication module 402, metrology module 404, and power supply 406 may be configured to communicate status information via a local connection. For instance, communication status information may include shared performance data, such as a power status data of the node 400.

The power supply 406 may be capable of storing energy. In the event of a power outage, (e.g., the power supply 406 experiences a failure), the power supply 406 can provide an amount of stored energy (e.g., energy stored in a capacitor of power supply 406) to the communication module 402 and/or metrology module 404 to allow a performance of operations described herein. The power supply 406 may also be configured to ensure an orderly shutdown of the node 400 by providing a sufficient amount of stored energy to power node 400 during the outage condition, thereby enabling node 400 to generate and transmit a last gasp packet 202, consolidated last gasp 204, or another outage message, etc.

Other components, connections between components, and arrangements of components other than those shown in FIG. 4 are possible. Although the communication module 402, metrology module 404, power supply 406, communication device 408, measurement device 410, processors 412, 414, and memories 416, 418 are depicted in FIG. 4 as separate components in communication with one another, other implementations are possible. The processor 412 and memory 416 may be included in a single component, such as a microcontroller. The systems and components discussed herein are not limited to any particular hardware architecture or configuration.

Exemplary Methods of Operation

Figure 5:
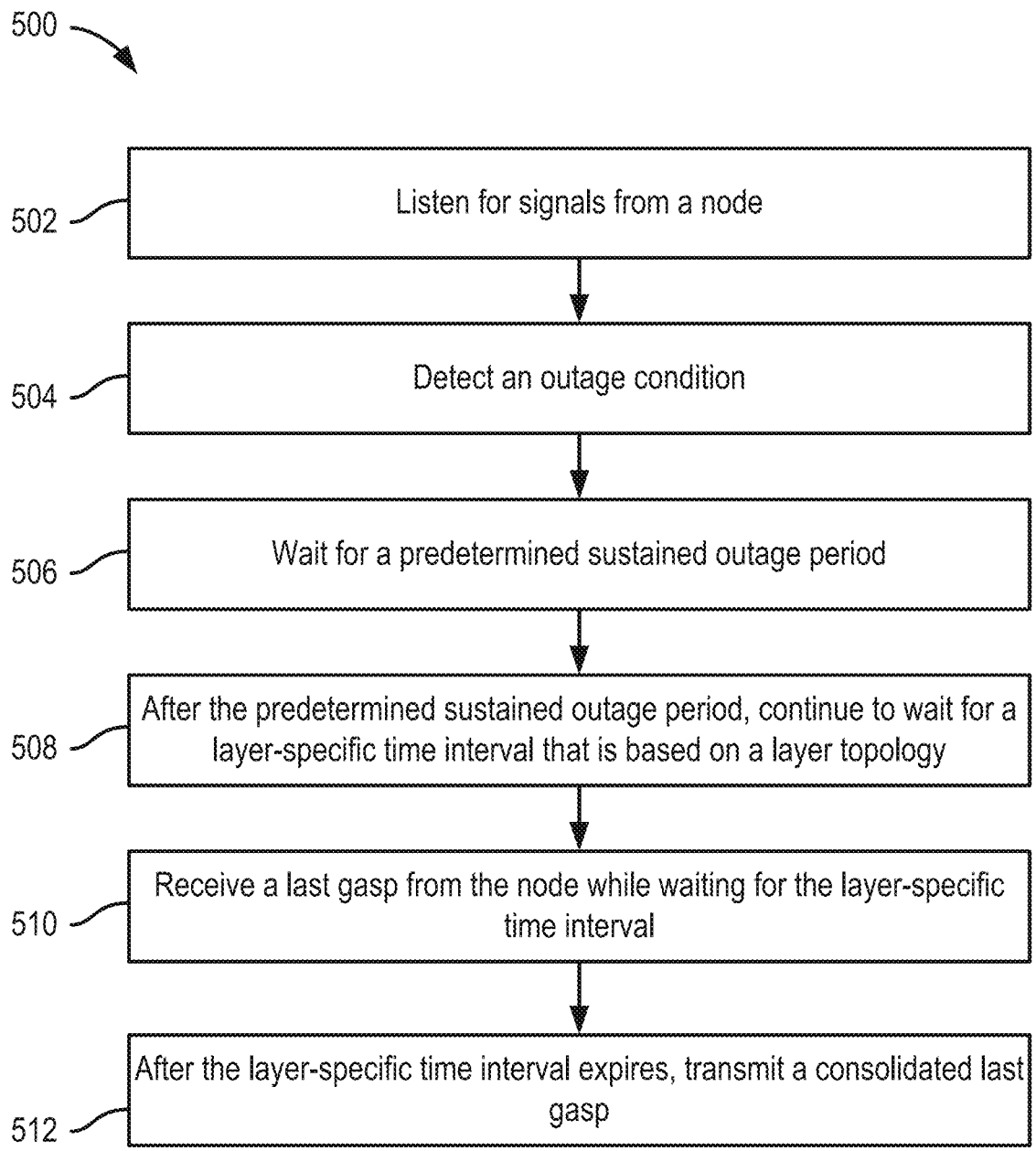
FIG. 5 illustrates an exemplary method of reporting outages using last gasps in a mesh network, according to certain aspects of this disclosure.

FIG. 5 illustrates an exemplary method 500 performed by a node. FIG. 5 represents an example of reporting network outages using last gasps in a mesh network. One or more operations described with respect to FIG. 5 involve communicating in a mesh network (e.g., a network environment 100 or 300). The network environment 100 facilitates communications between various network devices (e.g., head-end 104, root node 106, nodes 110-144, 400, etc.) according to aspects described herein. A communication device (e.g., node 400) implements operations depicted in FIG. 5 by executing suitable program code (e.g., software components related to last gasp packets 202, consolidated last gasps 204, etc.). For illustrative purposes, the method 500 is described with reference to certain examples depicted in the figures. Other implementations, however, are possible.

The method starts at block 502, where a node (e.g., node 110) listens for signals from other nodes. The node 110 is in communication with one or more other nodes (e.g., node 116). As described above, with respect to FIG. 1, the node 110 listens, among other nodes, for last gasps transmitted by these other nodes. The node 110 can listen for last gasps from child nodes, grandchild nodes, etc. The node 110 listens for last gasps, last gasp packets 202, consolidated last gasps 204, or other outage messages according to any of the techniques described herein.

In block 504, the node 110 detects an outage condition. For instance, node 110 may detect a power outage after receiving a status or other notification information from a module (e.g., a communication module 402, metrology module 404, or power supply 406). The node 110 may detect an outage condition and generate a last gasp packet 202. The node 110 can generate a last gasp packet 202, which includes information about the outage condition. Further, the node 110 can generate the last gasp packet 202 according to any of the techniques described herein.

The method proceeds from block 504 to block 506, where the node 110 waits for a predetermined sustained outage period. The node 110 waits for the predetermined sustained outage period after experiencing an outage condition itself. The predetermined sustained outage period begins when the outage condition is detected by the node 110. As described above, multiple nodes may also experience their own outage conditions.

A mass, widespread, or total network outage may not be experienced by each of these nodes at the exact same instance in time. For instance, the node 110 may experience the outage condition before, during, or after one or more nodes 112-144. Typically, reporting of an outage occurs after the predetermined sustained outage period elapses. But in some examples, the predetermined sustained outage period may begin when a first node experiences an outage condition or reports their outage condition.

In an alternative implementation, the predetermined sustained outage period may begin when a first node within a given layer experiences an outage condition or reports their outage condition. Further, the predetermined sustained outage period for each of the nodes 110-144 may vary. For instance, the predetermined sustained outage period can vary based on one or more latent conditions, such as an amount of network traffic, network latencies, available bandwidth, number of nodes, proximity to the first node, relative position within a given layer, processing delays, transmission delays, etc.

The node 110 may wait for a predetermined sustained outage period that is defined by the head-end 104. In some examples, the root node 106 can assign the predetermined sustained outage period. In other examples, the predetermined sustained outage period may be dictated by one or more capabilities of the node 110. For instance, the predetermined sustained outage period may be determined based on an estimated amount of time that the node 110 is capable of sending a last gasp before total failure. The predetermined sustained outage period may be based on an amount of time remaining before a backup battery or capacitor would be exhausted (e.g., the stored energy of power supply 406 was drained). The predetermined sustained outage period may be offset from a total drainage of the power supply 406 in a manner to ensure the remaining stored energy of the node 110 was sufficient to generate and transmit a last gasp, last gasp packet 202, consolidated last gasp 204, another outage message, etc.

A last gasp may be implemented using configuration parameters. The last gasp can be tuned to the needs of a resource provider, for example, by modifying one or more configurations parameters. A modification of configuration parameters can be used to selectively filter last gasps based on a topology of a mesh network. Advantageously, by filtering some last gasps based on the topology of the mesh network, a resource provider may reduce a number of duplicate last gasps. Further, the resource provider may tune the configuration parameters to minimize a number of last gasps to be filtered to ensure filtering does not erroneously cause a failure to report an outage.

In one example, the last gasp can be implemented without changing or updating existing firmware on the node 110. The last gasp may use the predetermined sustained outage period described above. An expiration of the predetermined sustained outage period may represent a time when the node 110 validates an outage condition and/or reports the event. The predetermined sustained outage period may be 30 s.

In block 508, after the predetermined sustained outage period expires, the node 110 continues to wait for a layer-specific time interval. The layer-specific time interval is calculated based on a topology of the layer in which node 110 resides (e.g., layer 2). For example, a layer-specific time interval may be calculated using the following expression.

$$\text{Layer-Specific Time Interval} = (k \cdot (N-M)) + \text{random}(k)$$

Here, k represents a value of a coefficient that can be adjusted according to a topology of a network layer, N represents a "cap" routing layer (e.g., a routing layer that is the furthest removed from layer 1 in the network topology) that is to be considered by the node, M represents a routing layer of a node (e.g., node 110) performing this computation, and random(k) represents a timing offset amount that is randomly selected. A value of random(k) may include a timing offset amount that is between 0 and k ms. In additional or alternative aspects, the value of random(k) may be a pseudo-random integer between 0 ms and an upper bound of k ms.

The last gasp may include additional configuration parameters. For instance, the last gasp can be implemented using a specified timing value, k. As described above, with respect to layer-specific time intervals 304-316 shown in FIG. 3, a duration of each of the layer-specific time intervals 304-316 may vary. Thus, the value of the coefficient k can be adjusted to modify a layer-specific time interval (e.g., layer-specific time intervals 304-316). In addition to being adjustable according to a topology of a network layer, the value of k may be selected to ensure a minimum duration for a layer-specific time interval. The value of k may be optimized to ensure a sufficient amount of time is allocated for the layer-specific time interval for a node to process and send a last gasp (e.g., a minimum layer-specific time interval of at least 2.5 s). The value of k may also be optimized to reduce the layer-specific time interval to a sufficiently short amount of time, in order to minimize a risk of a high number of collisions.

The last gasp may also include configuration parameters for a value of N. In some examples, the value of N may provide a value that bounds a highest layer to be used for the mesh network. In one example, the value of N may be predetermined (e.g., a maximum value of 5). The maximum value of N being 5 may be assigned (e.g., by the head-end 104 or root node 106) based on a majority of nodes residing within (or below) layer 5 of the mesh network. Setting a maximum value of N may ensure that a widespread or total network outage is accurately reported.

Advantageously, setting a maximum value to cap N to 5 (or less) can minimize an overall length of last gasp intervals, which in turn, may reduce an amount of time between an occurrence of a first outage condition and the reception of the outage report by the head-end 104 and/or root node 106. Further, minimizing the overall length of last gasp intervals can also reduce network costs by decreasing an amount of stored energy required by nodes (e.g., nodes 110-144). This decreased in the required amount of stored energy needed to send last gasps may enable a usage of less expensive power supplies (e.g., power supplies 406). Thus, a service provider may use power supplies 406 that use lower cost batteries, capacitors, etc. Accordingly, certain aspects described herein can increase an overall reliability of the outage reporting, while also reducing network costs.

In block 510, the node 110 receives a last gasp from the node 116 while waiting for the layer-specific time interval. The last gasp from node 116 includes an identifier ("ID") for the node 116 and layer-specific information for the node 116. The node 110 generates a consolidated last gasp 204 that includes outage information from one or more additional nodes. The outage information may originate from one or more other nodes that reside in a different layer, the same layer, or a combination of these.

The node 116 that is experiencing the outage condition detects a power outage within itself after receiving a notification from a module within the node 114 (e.g., from communication module 402, metrology module 404, or power supply 406). Upon detecting the power outage, the node 116 that is experiencing the outage condition initiates an ordered shutdown process, such as turning off various components, saving relevant data to the storage device, etc. In response to the detected power outage the node 116 also sends the last gasp packet 202. The node 110 receives the last gasp packet 202 from node 116 during the layer-specific time interval associated with layer 2 (e.g., based on the calculation described above with respect to block 508). The node 110 can receive last gasp packets 202, consolidated last gasps 204, or other outage information from any number of nodes (e.g., nodes 114, 116, 120, 122, 126, 128, 130, 136, 138, 140, etc.).

The method proceeds from block 510 to block 512, where the node 110 transmits a consolidated last gasp after the layer-specific time interval expires. For instance, the node 110 generates a consolidated last gasp 204 that includes the last gasp packet 202 from a node experiencing an outage condition (e.g., node 116). The node 110 can retrieve the consolidated last gasp 204 that includes the last gasp packet 202 from node 116 (e.g., from memory 416).

The node 110 can then transmit the consolidated last gasp 204 to the root node 106. Each node (e.g., nodes 110-144) may select a random time within its own layer-specific time interval to transmit a last gasp. Further, the node 110 may transmit the consolidated last gasp 204 to the root node 106 via a unicast, multicast, broadcast, or any other suitable type of message.

The node 110 transmits the consolidated last gasp 204 to the root node 106 with instructions to relay the outage information to the head-end 104. If the node 110 is a powered node, then the node 110 can relay the consolidated last gasp 204 or another outage message to the head-end 104 (e.g., via root node 106). Such a powered node 110 may act as a proxy and randomize a transmission of last gasp packets 202, consolidated last gasps 204, or other outage messages to the root node 106. The powered node 110 does not need to follow the layer-specific interval process, but the powered node 110 may still send a relay message (e.g., a consolidated outage message) to report the outage after receiving the last gasp.

The node 110 transmits a consolidated last gasp 204 that includes outage information from more than two nodes (e.g., nodes 110 and 116). For instance, the node 110 can transmit a consolidated last gasp 204 that includes any suitable number of last gasps. The node 110 generates the consolidated last gasp 204 using last gasp packets 202, consolidated last gasps 204, or other outage information from multiple nodes in a number of different layers. The node 110 may be configured to either process or ignore last gasps received from nodes within its own layer (e.g., from node 112 in the same layer 2). The node 110 can generate the consolidated last gasp 204 by concatenating last gasps.

For instance, the node 110, residing in layer 2, may generate a consolidated last gasp 204 that concatenates a consolidated last gasp 204 from node 114 in layer 3, the above-mentioned last gasp packet 202 from node 116 in layer 3, a consolidated last gasp 204 from node 120 in layer 4, and a last gasp packet 202 from node 126 in layer N−1. The node 110 generates a consolidated last gasp 204 that includes outage information from each of the nodes 114, 116, 120, and 126. The node 110 can generate the consolidated last gasp 204 to include an identifier (e.g., node ID 210) for each of the 114, 116, 120, and 126 and an indication of their respective layer (e.g., node layer 208).

The node 110 can generate the consolidated last gasp 204 according to any of the techniques described herein. The node 110 may transmit a maximum number of consolidated last gasps 204 (e.g., a maximum of 5 consolidated last gasps 204). For instance, the node 110 can transmit 5 consolidated last gasps 204 during the layer-specific time interval for layer 2. Since a single consolidated last gasp 204 may include up to 12 node IDs, by transmitting the 5 consolidated last gasps 204, node 110 reports outage information for up to 60 nodes.

In some examples, node 110 de-duplicates one or more consolidated last gasps 204 before transmission. For instance, the node 110 may determine a need to de-duplicate the consolidated last gasp 204 that includes outage information (e.g., node ID 210) from each of the nodes 114, 116, 120, and 126. The node 110 can determine the last gasp (e.g., the consolidated last gasp 204) from node 120 in layer 4 includes a duplicate last gasp (e.g., the last gasp packet 202 from node 126 in layer N−1). In response, node 110 de-duplicates the duplicate last gasp before generating the consolidated last gasp 204 by removing and/or discarding a copy of the duplicate message. In additional or alternative aspects, node 110 may de-duplicate the duplicate message after generating the consolidated last gasp 204 (e.g., but before transmission). Further, node 110 can maintain or remove any node IDs that are present in the consolidated last gasp 204.

GENERAL CONSIDERATIONS

Numerous specific details are set forth herein to provide a thorough understanding of the claimed subject matter. Those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (e.g., computer-readable instructions stored on a memory of the computer system) that programs or configures the computing system from a general-purpose computing apparatus to a specialized computing apparatus implementing one or more aspects of this disclosure. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing is provided for purposes of illustrating, describing, and explaining aspects of the present disclosure and is not intended to be exhaustive or to limit the disclosure to the precise forms disclosed. Further modifications and adaptation of these aspects will be apparent to those skilled in the art and may be made without departing from the scope and spirit of the disclosure. Different arrangements of the components described above, as well as components and steps not shown or described are possible. Similarly, some features and sub-combinations are useful and may be employed without reference to other features and sub-combinations. Aspects of the disclosure have been described for illustrative and not restrictive purposes, and alternative aspects will become apparent to readers of this patent.

What is claimed is:

1. A method for reporting outage information in a multi-layer mesh network, the method comprising:
    detecting, by a first node in layer N of the multi-layer mesh network, an outage condition;
    after detecting the outage condition, waiting for a predetermined sustained outage period;
    after the predetermined sustained outage period expires, continuing to wait for a layer-specific time interval, wherein the layer-specific time interval is based on a topology of layer N;
    receiving a last gasp from a second node in layer N+1 of the multi-layer mesh network, wherein the last gasp includes a second identifier for the second node and an indication of layer N+1; and
    after the layer-specific time interval expires, transmitting a consolidated last gasp, wherein the consolidated last gasp includes a first identifier for the first node, an indication of layer N, the second identifier for the second node, and the indication of layer N+1.

2. The method of claim 1, further comprising:
    receiving, by a powered node, the consolidated last gasp; and
    transmitting, by the powered node, a consolidated outage message to a head-end, wherein the consolidated outage message includes outage information associated with the consolidated last gasp.

3. The method of claim 2, wherein the powered node is a root node in a first layer, the root node comprising a collector, and further comprising:
    after the layer-specific time interval expires, transmitting the consolidated outage message to the head-end via a separate communications network.

4. The method of claim 1, further comprising:
    receiving, by a third node in layer N−1 of the multi-layer mesh network, the consolidated last gasp.

5. The method of claim 1, wherein the last gasp comprises a last gasp packet that includes a timestamp corresponding to a time of the outage condition.

6. The method of claim 1, wherein the outage condition is a first outage condition, the consolidated last gasp is a first consolidated last gasp, and further comprising:
    determining, by the first node, the last gasp from the second node is a second consolidated last gasp that includes a third identifier for a third node and an indication of layer N+2;
    determining, by the first node, a second outage condition of the third node based on the second consolidated last gasp; and
    generating, by the first node, the first consolidated last gasp, wherein the first consolidated last gasp includes the third identifier for the third node and the indication of layer N+2.

7. The method of claim 1, wherein the last gasp is a first last gasp, and further comprising:
    receiving, by the first node, a second last gasp from a third node in layer N+2 of the multi-layer mesh network, wherein the second last gasp includes a third identifier for the third node and an indication of layer N+2; and
    generating, by the first node, the consolidated last gasp, wherein the consolidated last gasp includes the third identifier for the third node and the indication of layer N+2.

8. The method of claim 7, further comprising:
determining, by the first node, the second last gasp from the third node includes a duplicate message; and
before generating the first consolidated last gasp, de-duplicating, by the first node, the second last gasp by removing a copy of the duplicate message.

9. The method of claim 7, further comprising:
determining, by the first node, the second last gasp from the third node includes a duplicate message; and
de-duplicating, by the first node, the first consolidated last gasp by removing a copy of the duplicate message.

10. The method of claim 7, further comprising:
generating, by the first node, the first consolidated last gasp by concatenating the first last gasp and the second last gasp into the first consolidated last gasp.

11. A system, comprising:
a first node in layer N of a multi-layer mesh network, the first node configured to:
detect an outage condition;
after detecting the outage condition, wait for a predetermined sustained outage period;
after the predetermined sustained outage period expires, continue to wait for a layer-specific time interval, wherein the layer-specific time interval is based on a topology of layer N in the multi-layer mesh network;
receive a last gasp from a second node in layer N+1 of the multi-layer mesh network, wherein the last gasp includes a second identifier for the second node and an indication of layer N+1; and
after the layer-specific time interval expires, transmit a consolidated last gasp, wherein the consolidated last gasp includes a first identifier for the first node, an indication of layer N, the second identifier for the second node, and the indication of layer N+1.

12. The system of claim 11, further comprising a third node in layer N−1 of the multi-layer mesh network, wherein the third node is configured to:
receive the consolidated last gasp; and
transmit a consolidated outage message to a head-end, wherein the consolidated outage message includes outage information associated with the consolidated last gasp.

13. The system of claim 11, wherein the outage condition is a first outage condition, the consolidated last gasp is a first consolidated last gasp, and the first node is further configured to:
determine the last gasp from the second node is a second consolidated last gasp that includes a third identifier for a third node and an indication of layer N+1;
determine a second outage condition of the third node based on the second consolidated last gasp; and
generate the first consolidated last gasp, wherein the first consolidated last gasp includes the third identifier for the third node and the indication of layer N+1.

14. The system of claim 11, wherein the last gasp is a first last gasp, and further comprising:
receive a second last gasp from a third node in layer N+1 of the multi-layer mesh network, wherein the second last gasp includes a third identifier for the third node and an indication of layer N+1; and
generate the consolidated last gasp, wherein the consolidated last gasp includes the third identifier for the third node and the indication of layer N+1.

15. The system of claim 14, further comprising:
determine the second last gasp from the third node includes a duplicate message; and
before generating the first consolidated last gasp, de-duplicate the second last gasp by removing a copy of the duplicate message.

16. The system of claim 14, further comprising:
generate the first consolidated last gasp by concatenating the first last gasp and the second last gasp into the consolidated last gasp.

17. A first node in layer N of a multi-layer mesh network, comprising:
a processor configured to execute computer-readable instructions; and
a memory comprising the computer-readable instructions which, when executed by the processor, are configured to cause the processor to perform operations comprising:
detecting an outage condition;
after detecting the outage condition, waiting for a predetermined sustained outage period;
after the predetermined sustained outage period expires, continuing to wait for a layer-specific time interval, wherein the layer-specific time interval is based on a topology of layer N;
receiving a last gasp from a second node in layer N+1 of the multi-layer mesh network, wherein the last gasp includes a second identifier for the second node and an indication of layer N+1; and
after the layer-specific time interval expires, transmitting a consolidated last gasp, wherein the consolidated last gasp includes a first identifier for the first node, an indication of layer N, the second identifier for the second node, and the indication of layer N+1.

18. The first node of claim 17, wherein the outage condition is a first outage condition, the consolidated last gasp is a first consolidated last gasp, and the operations further comprising:
determining the last gasp from the second node is a second consolidated last gasp that includes a third identifier for a third node and an indication of layer N+2;
determining a second outage condition of the third node based on the second consolidated last gasp; and
generating the first consolidated last gasp, wherein the first consolidated last gasp includes the third identifier for the third node and the indication of layer N+2.

19. The first node of claim 17, wherein the last gasp is a first last gasp, and the operations further comprising:
receiving a second last gasp from a third node in layer N+2 of the multi-layer mesh network, wherein the second last gasp includes the third identifier for the third node and the indication of layer N+2; and
generating the consolidated last gasp, wherein the consolidated last gasp includes the third identifier for the third node and the indication of layer N+2.

20. The first node of claim 19, the operations further comprising:
determining the second last gasp from the third node includes a duplicate message; and
before generating the consolidated last gasp, de-duplicating the second last gasp by removing a copy of the duplicate message.

21. The first node of claim 19, the operations further comprising:
generating the consolidated last gasp by concatenating the first last gasp and the second last gasp into the consolidated last gasp.

22. The first node of claim 17, wherein the outage condition is a first outage condition, the last gasp is a first last gasp, and the operations further comprising:

during the layer-specific time interval, receiving:

a second last gasp from a third node in layer N+2 of the multi-layer mesh network, wherein the second last gasp includes a third identifier for the third node and an indication of layer N+2;

a third last gasp from a fourth node in layer N+3 of the multi-layer mesh network, wherein the third last gasp includes a fourth identifier for the fourth node and an indication of layer N+3; and generating the consolidated last gasp, wherein the consolidated last gasp includes the first identifier for the first node, the indication of layer N, the second identifier for the second node, the indication of layer N+1, the third identifier for the third node, the indication of layer N+2, the fourth identifier for the fourth node, and the indication of layer N+3.

23. A first node in layer N of a multi-layer mesh network, comprising:

a processor configured to execute computer-readable instructions; and a memory comprising the computer-readable instructions which, when executed by the processor, are configured to cause the processor to perform operations comprising:

detecting an outage condition;

after detecting the outage condition, waiting for a predetermined sustained outage period;

after the predetermined sustained outage period expires, continuing to wait for a layer-specific time interval, wherein the layer-specific time interval is based on a topology of layer N in the multi-layer mesh network;

receiving a last gasp from a second node in layer N+1 of the multi-layer mesh network, wherein the last gasp includes a second identifier for the second node and an indication of layer N+1; and before the layer-specific time interval expires, transmitting a consolidated last gasp, wherein the consolidated last gasp includes a first identifier for the first node, an indication of layer N, the second identifier for the second node, and the indication of layer N+1.

\* \* \* \* \*